United States Patent [19]

Kajimoto et al.

[11] Patent Number: 4,689,387

[45] Date of Patent: Aug. 25, 1987

[54] S-ALKYL THIOCARBAMATE BASE LENS RESIN

[75] Inventors: Nobuyuki Kajimoto; Akihiro Tamaki; Teruyuki Nagata, all of Omuta, Japan

[73] Assignee: Mitsui Toatsu Chemicals, Incorporated, Tokyo, Japan

[21] Appl. No.: 843,189

[22] Filed: Mar. 24, 1986

[51] Int. Cl.$^4$ .............................................. C08G 18/38
[52] U.S. Cl. ...................... 528/76; 350/321; 528/80; 528/81; 528/85
[58] Field of Search .................. 528/76, 80, 81, 85; 350/321

[56] References Cited

U.S. PATENT DOCUMENTS 3,114,734 12/1963 Gobran et al. ...................... 528/44

*Primary Examiner*—Maurice J. Welsh
*Attorney, Agent, or Firm*—Oblon, Fisher, Spivak, McClelland, & Maier

[57] ABSTRACT

An S-alkyl thiocarbamate base lens resin is obtained by reacting one or more NCO-containing compounds, such as xylylene diisocyanate, hexamethylene diisocyanate and/or tetrachloroxylylene diisocyanate, with one or more SH-containing aliphatic compounds, for example, a di(2-mercaptoalkyl) ether.

15 Claims, No Drawings

S-ALKYL THIOCARBAMATE BASE LENS RESIN

BACKGROUND OF THE INVENTION (1) Field of the Invention

This invention relates to an S-alkyl thiocarbamate base lens resin having a high refractive index and good machinability.

(2) Description of the Prior Art

In Japan, more and more plastic lenses have recently been employed as eyeglass lenses and camera lenses and in optical devices, since they are lighter and less fragile compared with inorganic glass lenses and permit coloration. As a representative resin employed widely for the above purposes these days, these may be mentioned a radical polymerization product of diethylene glycol bisallyl carbonate. The radical polymerization product will hereinafter be abbreviated as "DAC resin". Although the DAC resin has various advantages such as excellent impact resistance, reduced temperature dependency of lenses' refractive powers, light weight, superb colorability, good machinability such as high degrees of easiness in its cutting and polishing (hereinafter called "cutting and polishing easiness" for the sake of brevity), etc., it cannot be considered to have sufficient properties as a resin for lenses in view of the recent trend toward fashion-oriented lenses in the field of eyeglass lenses.

As the most serious drawback of the DAC resin, its refractive index is smaller compared with those of inorganic lens (refractive index of a typical inorganic lens, $N_D^{20°C}$: 1.52; refractive index of a DAC resin lens, $N_D^{20°C}$: 1.50). When the DAC resin is molded into a lens, the lens has a greater thickness. In the case of high refractive-power eyeglass lenses for the near-sighted in particular, the lenses have great peripheral thicknesses. Use of the DAC resin cannot achieve weight reduction and moreover results in eyeglass lens of poor visual attraction. Accordingly, lenses which make use of the DAC resin as a raw material are shunned due to the human tendency to place importance on fashionability.

For the reasons mentioned above, there is an outstanding demand for a lens resin having a higher refractive index than the DAC resin, in other words, capable of providing thinner lens thicknesses than the DAC resin.

As one of lens resins capable of achieving high refractive indexes, there has been known a urethane resin obtained by a reaction of an isocyanate compound with a hydroxyl-containing compound such as diethylene glycol (Japanese Patent Laid-Open No. 136601/1982 or 136602/1982) or with a halogen- and hydroxyl-containing compound such as tetrabromobisphenol A (Japanese Patent Laid-Open No. 164615/1983).

These urethane-base resins are however unable to obtain refractive indexes beyond a certain level. In order to obtain a resin having a refractive index, $N_D^{20°C}$, in the neighborhood of about 1.60 or higher, it is indispensable to use an aromatic isocyanate and/or a monomer containing many halogen atoms as substituents therein. However, use of such monomers leads to a drawback in external appearance that the resultant resin is colored and another drawback in chemical and physical properties that the resultant resin has poor weatherability and poor cutting and polishing easiness.

SUMMARY OF THE INVENTION

The principal object of this invention is to provide a lens resin which has a refractive index substantially equal to or higher than the above-described urethane-base resins, is free of defects in external appearance such as coloration and enjoys excellent weatherability and good machinability such as good cutting and polishing easiness.

The present inventors have carried out an extensive investigation with a view toward attaining the above object of this invention, leading to completion of this invention.

In one aspect of this invention, there is thus provided an S-alkyl thiocarbamate base lens resin obtained by reacting one or more NCO-containing compounds with one or more SH-containing aliphatic compounds.

When the S-alkyl thiocarbamate base lens resin of this invention is used, a lens having a very high refractive index can be obtained. Indeed, in case kinds of a NCO-containing compound and a SH-containing aliphatic compound are fitly selected, a refractive index ($N_D^{20°C}$) as high as 1.60 or even higher can easily be obtained. In addition, it is free of defects in external appearance such as coloration and also excellent in weatherability. Further, the above-described conventional urethane-base resins showed poor machinability such as poor cutting and polishing easiness unless a trifunctional or higher compound was incorporated. The resin of this invention has good machinability such as good cutting and polishing easiness, which is required for lens resins, without absolute need for incorporation of any trifunctional three-dimensionally crosslinking agent.

The above and other objects, features and advantages of this invention will become apparent from the following description and the appended claims.

DETAILED DESCRIPTION OF THE INVENTION AND PREFERRED EMBODIMENTS

In the present invention, one or more NCO-containing compounds can be used as one of the two types of starting raw materials. However, a major fraction of the starting NCO-containing raw material must be composed of a compound containing two or more isocyanate groups (NCO groups). The one or more NCO-containing compounds may be either aromatic or aliphatic. Aromatic compounds may be nucleus-substituted by one or more halogens and/or the like. As these NCO-containing compounds, may, for example, be mentioned m-xylylene diisocyanate, p-xylylene diisocyanate, tetrachloro-m-xylylene diisocyanate, tetrachloro-p-xylylene diisocyanate, hexamethylene diisocyanate, isophorone diisocyanate, tolylene diisocyanate, 4,4'-diphenylmethane diisocyanate, the biuret reaction product of hexamethylene diisocyanate, the adduct reaction product of hexamethylene diisocyanate and trimethylolpropane, 4,4'-dichlorohexylmethane diisocyanate and 2-isocyanatoethyl 2,6-diisocyanatohexanoate. Among these NCO-containing compounds, particularly-preferable NCO-containing compounds are aromatic diisocyanates, in each of which two side-chain alkyl groups have been substituted by two NCO groups, such as m-xylylene diisocyanate, and aliphatic diisocyanates such as hexamethylene diisocyanate.

On the other hand, one or more SH-containing aliphatic compounds can be used as the other starting raw material. However, a major fraction of the starting SH-containing aliphatic raw material must be composed of a compound containing two or more SH groups or alternatively, one one or more SH groups and one or more OH groups in combination. As these SH-containing aliphatic compounds, may, for example, be mentioned di(2-mercaptoethyl) ether, 1,2-ethanedithiol, 1,4-butanedithiol, di(2-mercaptoethyl) sulfide, 2-mercaptoethanol, ethylene glycol dithioglycolate, trimethylolpropane tris-(thioglycolate) and pentaerythritol tetrakis-(thioglycolate). Di(2-mercaptoalkyl) ethers are particularly preferred and are readily available at relatively low prices.

The one or more NCO-containing compounds and the one or more SH-containing aliphatic compounds may be used in such proportions that the ratio of NCO groups to SH groups falls within a range of 0.5–3.0 or preferably within a range of 0.5–1.5. Any NCO/SH ratios smaller than 0.5 will lead to insufficient resin hardening upon the reaction, whereby various properties of the resulting resins as lens resins, for example, impact resistance and machinability for the production of lenses such as cutting and polishing easiness will be poor. If the NCO/SH ratio exceeds 3.0 on the other hand, the inherent advantage of the S-alkyl thiocarbamate base lens resin, namely, the high refractive index will not be achieved.

As the SH-containing aliphatic starting raw material, it is possible to use a compound, which contains one or more OH groups in addition to one or more SH groups, either singly or in combination with another SH-containing aliphatic compound as mentioned above. When such an SH- and OH-containing compound is used, it is preferable to use the SH- and OH-containing compound in such a proportion, relative to the associated NCO-containing compound or compounds, that the NCO/(SH +OH) ratio falls within the range of 0.5–1.5.

In order to make the resultant polymer have a three-dimensional structure and hence to permit production of lenses of high hardness, it is preferable as the NCO- and SH-containing starting raw materials, in addition to those having two functional (NCO; SH or SH and CH) groups, to suitably add an isocyanate compound containing three or more NCO groups and/or a mercapto aliphatic compound containing three SH groups or containing three SH and OH groups in total while still adhering to the above-mentioned range of the group ratio.

Besides, it is also feasible, without causing any problems or inconvenience, to add a radical-polymerizable raw material such as diethylene glycol bis(allyl carbonate) (DAC), an acrylic ester, a methacrylic ester or a styrene derivative along with its radical polymerization initiator, an ultraviolet absorbent and/or antioxidant for improving the light resistance, etc. in small amounts depending what requirements would be imposed as a lens resin, so long as these additional components do not prevent the attainment of the object of this invention.

The lens resin of this invention can be produced in the following manner.

Casting polymerization is usually used. First of all, the one or more NCO-containing compounds (hereinafter called "Component A" for the sake of brevity) and the one or more SH-containing aliphatic compounds (hereinafter called "Component B" for the sake of brevity) are stirred and mixed. Upon formation of a uniform liquid mixture, it is deaerated. Thereofafter, the mixture is poured in a glass- or metal-made mold, in which the reaction of both components is allowed to proceed at a suitable temperature so as to harden the liquid mixture. Component A and Component B may, in many instances, separate into two layers in an incipient period of their mixing. As their mixing proceeds, the reaction between Component A and Component B is also allowed to proceed further so that the two layers make up a single uniform layer. Even when the deaeration of the uniform liquid mixture has been effected sufficiently, the reaction may explosively proceed in the mold depending on the type of Component A or Component B and the reaction may thus be accompanied by occurrence of bubbles. In order to avoid such a phenomenon, it is necessary to conduct the polymerization reaction while effecting sufficient heat removal and precise temperature control. Although the reaction time and reaction temperature vary depending on the combination of Component A and Component B, the polymerization is generally carried out at $-20°$ C. $-+80°$ C. for 24 hrs.–72 hrs. The hardness of the polymer resulting from the reaction reaches the maximum at the time point where the polymerization reaction has been completed and it does not increase beyond that maximum level. The polymerization may be stopped at or before the above-mentioned time point. As a matter of fact, the polymerization may be stopped at any time point so long as the resultant resin has sufficient properties as an eyeglass lens of a high refractive index which the present invention intends to provide. Since the starting two-component system is not uniform in many instances in the above polymerization as mentioned above, it is particularly important to pour and harden the mixture of the two components after thoroughly stirring and mixing the two components and forming a completely-uniform single layer prior to their pouring.

In addition to the higher refractive index, the resin of this invention obtained in the above-described manner has inter alia the following advantages over conventionally known lens resins, because it contains S atoms as thiocarbamate groups.

1. It provides tough plastic lenses.
2. It is colorless and transparent.
3. It has excellent impact resistance.
4. It has good cutting and polishing easiness and is hence superior in machinability.
5. It has a relatively small shrinkage factor upon its molding and polymerization.
6. It has a relatively low specific gravity and thus a light weight.

In order to apply some surface modification such as antireflection, higher hardness, improved abrasion resistance, improved chemical resistance, fog resistance and/or the like, some additional known physical and/or chemical treatments may also be applied to a lens which makes use of the resin of this invention as its resin component.

Having generally described the invention, a more complete understanding can be obtained by reference to certain specific Examples and Comparative Examples, which are provided herein for purposes of illustration only and are not intended to be limiting unless otherwise specified.

EXAMPLE 1

Mixed were 9.4 g (0.050 mole) of m-xylylene diisocyanate as Component A and 6.9 g (0.050 mole) of di(2-mercaptoethyl) ether as Component B. The resultant mixture was stirred at room temperature or so into a uniform mixture, followed by its deaeration. The liquid mixture was then poured into a glass-made lens mold which had been treated in advance by making it hydrophobic or coating a parting agent thereon so as to facilitate its parting from a resin to be formed therein. The liquid mixture was heated and hardened at 70° C. for 48 hours.

The resultant lens molding was extremely tough, colorless and transparent, and had good impact resistance and good cutting and polishing easiness. Its refractive index ($N_D^{20°}$ C.) was as high as 1.62 while its specific gravity was 1.34. Results are shown in Table 1.

EXAMPLES 2-8

In the same manner as in Example 1, Component A and Components B described in Table 1 were mixed, homogenized, deaerated, poured into a glass-made lens mold and then hardened. Results are shown in Table 1.

COMPARATIVE EXAMPLES 1

Mixed were 9.4 g (0.050 mole) of m-xylylene diisocyanate and 5.3 g (0.050 mole) of diethylene glycol. The resultant mixture was heated with stirring at 40°-50° C., thereby obtaining a homogeneous mixture. It was then cooled with water to remove reaction heat.

After deaeration, the liquid mixture was poured in a glass-made lens mold similar to that employed in Example 1 and was then hardened at 20°-30° C. for 48 hours. As understood from the results shown in Table 1, the resultant lens molding was colorless and transparent and had good impact resistance. Its refractive index ($N_D^{20°\ C.}$) was 1.56 and its specific gravity was as light as 1.18. However, the cutting and polishing easiness was poor.

COMPARATIVE EXAMPLES 2

Mixed were 9.4 g (0.050 mole) of m-xylylene diisocyanate and 27.2 g (0.050 mole) of tetrabromobisphenol A. The resultant mixture was heated with stirring at 50° C. until the latter was dissolved uniformly in the former. After deaeration, the resultant solution was poured in a glass-made lens mold similar to that employed in Example 1. The solution was maintained at 80° C. for 5 hours and then at 100° C. for 24 hours, thereby hardening same. As understood from the results shown in Table 1, the resultant lens molding was pale yellow and transparent. Its refractive index was 1.61. Its cutting and polishing readiness was not good and its specific gravity was 1.52.

In Table 1, the following abbreviations will be used.
(1) m-XDI for m-xylylene diisocyanate:

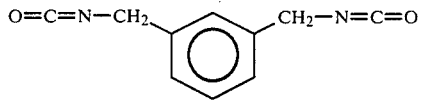

(2) HDI for hexamethylene diisocyanate:

(3) p-XDI for p-xylylene diisocyanate:

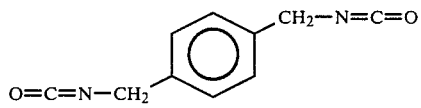

(4) TC-m-XDI for tetrachloro-m-xylylene diisocyanate:

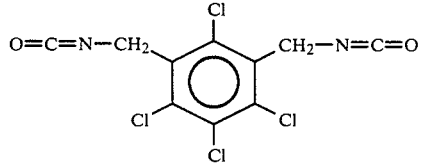

(5) PETG for pentaerythritol tetrakis-(thioglycolate):

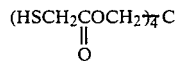

(6) TMTG for trimethylolpropane tris-(thioglycolate):

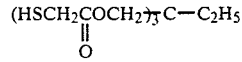

TABLE 1

| | Raw material for polymerization | | | Property of polymer | | | |
|---|---|---|---|---|---|---|---|
| | Component A Isocyanate compound | Component B Mercapto compound | NCO/SH ratio | Refractive index $N_D^{20°\ C.}$ | Cutting and polishing easiness* | Specific gravity | External appearance |
| Ex. 1 | m-XDI (0.050 mole) | HSC$_2$H$_4$OC$_2$H$_4$SH (0.050 mole) | 1.0 | 1.62 | | 1.34 | colorless, transparent |
| Ex. 2 | m-XDI (0.050 mole) | PETG (0.025 mole) | 1.0 | 1.60 | | 1.44 | colorless, transparent |
| Ex. 3 | m-XDI (0.050 mole) | TMTG (0.033 mole) | 1.0 | 1.60 | | 1.33 | colorless, transparent |
| Ex. 4 | m-XDI (0.050 mole) | TMTG (0.050 mole) | 0.67 | 1.59 | | 1.35 | colorless, transparent |
| Ex. 5 | HDI (0.050 mole) | TMTG (0.033 mole) | 1.0 | 1.56 | | 1.33 | colorless, transparent |
| Ex. 6 | HDI (0.050 mole) | TMTG (0.050 mole) | 0.67 | 1.55 | | 1.30 | colorless, transparent |
| Ex. 7 | p-XDI (0.050 mole) | HSC$_2$H$_4$OC$_2$H$_4$SH (0.050 mole) | 1.0 | 1.61 | | 1.33 | colorless, transparent |
| Ex. 8 | TC-m-XDI (0.050 mole) | HSC$_2$H$_4$OC$_2$H$_4$SH (0.050 mole) | 1.0 | 1.64 | | 1.36 | colorless, transparent |
| Comp. Ex. 1 | m-XDI (0.050 mole) | HOC$_2$H$_4$OC$_2$H$_4$OH (0.050 mole) | 1.0 | 1.56 | X | 1.18 | colorless, transparent |

TABLE 1-continued

| | Raw material for polymerization | | | Property of polymer | | | |
|---|---|---|---|---|---|---|---|
| | Component A Isocyanate compound | Component B Mercapto compound | NCO/SH ratio | Refractive index $N_D^{20°\,C.}$ | Cutting and polishing easiness* | Specific gravity | External appearance |
| Comp. Ex. 2 | m-XDI (0.050 mole) | 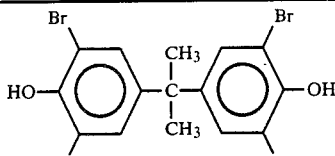 (0.050 mole) | 1.0 | 1.61 | Δ | 1.52 | pale yellow, transparent |

*  : good, Δ: relatively poor, X: poor.

Having now fully described the invention, it will be apparent to one of ordinary skill in the art that many changes and modification can be made thereto without departing from the spirit or scope of the invention as set forth hereon.

What is claimed is:

1. An S-alkyl thiocarbamate base lens resin obtained by reacting one or more NCO-containing compounds with one or more SH-containing aliphatic compounds, wherein the said SH-containing aliphatic compound is a di(2-mercaptoalkyl)ether, 1,4-butanedithiol, di(2-mercaptoethyl) sulfide, 2-mercaptoethanol, ethylene glycol dithioglycolate, trimethylolpropane tris-(thioglycolate), or pentaerythritol tetrakis-(thioglycolate).

2. An S-alkyl thiocarbamate base lens resin obtained by reacting one or more NCO-containing compounds with one or more SH-containing aliphatic compounds, wherein the said SH-containing aliphatic compound is a di(2-mercaptoalkyl)ether, 1,4-butanedithiol, di(2-mercaptoethyl) sulfide, 2-mercaptoethanol, ethylene glycol dithioglycolate, trimethylolpropane tris-(thioglycolate), or pentaerythritol tetrakis-(thioglycolate), wherein the said one or more NCO-containing compounds and the said one or more SH-containing aliphatic compounds are used in a ratio which provides a ratio of NCO groups to SH groups of from 0.5 to 3.0.

3. The S-alkyl thiocarbamate base lens resin of claim 1, wherein the said NCO-containing compound is xylylene diisocyanate, hexamethylene diisocyanate, or tetrachloroxylylene diisocyanate.

4. The S-alkyl thiocarbamate base lens resin of claim 1, wherein the said SH-containing aliphatic compound is a di(2-mercaptoalkyl)ether, pentaerythritol tetrakis-(thioglycolate), or timethylolpropane tris-(thioglycolate).

5. The S-alkyl thiocarbamate base lens resin of claim 1, wherein the said SH-containing aliphatic compounds comprise a di(2-mercaptoalkyl)ether.

6. The S-alkyl thiocarbamate base lens resin of claim 5, wherein the said di(2-mercaptoalkyl)ehter is di(2-mercaptoethyl)ether.

7. The S-alkyl thiocarbamate base lens resin of claim 2, wherein the said SH-containing aliphatic compounds comprises a di(2-mercaptoalkyl)ether.

8. The S-alkyl thiocarbamate base lens resin of claim 7, wherein the said di(2-mercaptoalkyl)ether is di(2-mercaptoethyl)ether.

9. A lens comprising a copolymer obtained by reacting one or more NCO-containing compounds with one or more SH-containing aliphatic compounds.

10. The lens of claim 9, wherein the said one or more NCO-containing compounds and the said one or more SH-containing aliphatic compounds are used in a ratio to provide a ratio of NCO groups to SH groups of from 0.5 to 3.0.

11. The lens of claim 9, wherein the said NCO-containing compounds comprise xylylene diisocyanate, hexamethylene diisocyanate, or tetrachloroxylylene diisocyanate.

12. The lens of claim 9, wherein the said SH-containing aliphatic compounds comprise a di(2-mercaptoalkyl)ether, pentaerythritol tetrakis-(thioglycolate), or trimethylolpropane tris-(thioglycolate).

13. The lens of claim 9, wherein the said SH-containing aliphatic compounds comprise a di(2-mercaptoalkyl)ether.

14. The lens of claim 13, wherein the said di(2-mercaptoalkyl)ether is di(2-mercaptoethyl)ether.

15. The lens of claim 9, wherein the said one or more NCO-containing compounds in the said one or more SH-containing aliphatic compounds are used in a ratio to provide a ratio of NCO groups to SH groups ranging from 0.5 to 1.5.

* * * * *

REEXAMINATION CERTIFICATE (2855th)
United States Patent [19]
Kajimoto et al.

[11] B1 4,689,387
[45] Certificate Issued Apr. 30, 1996

[54] S-ALKYL THIOCARBAMATE BASE LENS RESIN

[75] Inventors: Nobuyuki Kajimoto; Akihiro Tamaki; Teruyuki Nagata, all of Omuta, Japan

[73] Assignee: Mitsui Toatsu Chemicals, Incorporated, Tokyo, Japan

Reexamination Request:
No. 90/003,718, Feb. 9, 1995

Reexamination Certificate for:
Patent No.: 4,689,387
Issued: Aug. 25, 1987
Appl. No.: 843,189
Filed: Mar. 24, 1986

[51] Int. Cl.[6] .................................................. C08G 18/38
[52] U.S. Cl. ................... 528/76; 528/80; 528/81; 528/85; 350/321
[58] Field of Search .................. 528/76, 80, 81, 528/85; 350/321

[56] References Cited

U.S. PATENT DOCUMENTS

| | | | |
|---|---|---|---|
| 3,058,955 | 10/1962 | Neumann et al. | 528/77 |
| 3,061,557 | 10/1962 | Hostettler et al. | 528/55 |
| 3,114,734 | 12/1963 | Gobran et al. | 528/52 |
| 3,356,650 | 12/1967 | McElroy | 528/79 |
| 3,640,965 | 2/1972 | Brode et al. | 528/74 |
| 3,755,262 | 8/1973 | Slagel | 528/66 |
| 3,965,057 | 6/1976 | Ammons et al. | 528/73 |
| 4,101,529 | 7/1978 | Ammons | 528/67 |

FOREIGN PATENT DOCUMENTS

| | | |
|---|---|---|
| 18-3627 | 2/1943 | Japan . |
| 53-141397 | 12/1978 | Japan . |
| 56-116001 | 9/1981 | Japan . |
| 57-80428 | 5/1982 | Japan . |
| 60-199016 | 10/1985 | Japan . |
| 60-194401 | 10/1985 | Japan . |
| 63-46213 | 2/1988 | Japan . |
| 64-26622 | 1/1989 | Japan . |
| 1-215816 | 8/1989 | Japan . |
| 4-78801 | 3/1992 | Japan . |

OTHER PUBLICATIONS

J. Macromol. Sci. Chem., A9(7), pp. 1265–1271 (1975) Zochniak and Ossawski.
Fluka Catalogue 11, pp. 191, 351, (1978).
Plastic Handbook (pp. 556–557), 1969.
Manual of Chemistry, Fundamental Part II (p. 1115), 1966.
Encyclopedia Chemica (p. 377), 1963.

*Primary Examiner*—Rachel F. Johnson

[57] ABSTRACT

An S-alkyl thiocarbamate base lens resin is obtained by reacting one or more NCO-containing compounds, such as xylylene diisocyanate, hexamethylene diisocyanate and/or tetrachloroxylylene diisocyanate, with one or more SH-containing aliphatic compounds, for example, a di(2-mercaptoalkyl) ether.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 9 are determined to be patentable as amended.

Claims 3, 5–8, 10–15 dependent on an amended claim, are determined to be patentable.

New claims 16–23 are added and determined to be patentable.

1. An S-alkyl thiocarbamate base lens resin *consisting essentially of a resin* obtained by reacting one or more NCO-containing compounds with one or more SH-containing aliphatic compounds, wherein the said SH-containing aliphatic compound is a di(2-mercaptoalkyl)ether, 1,4-butanedithiol, di(2-mercaptoethyl) sulfide, 2-mercaptoethanol, ethylene glycol dithioglycolate, trimethylolpropane tris-(thioglycolate), or pentaerythritol tetrakis-(thioglycolate), *said S-alkyl thiocarbamate base lens resin being capable of forming a lens by casting polymerization in a lens mold.*

2. An S-alkyl thiocarbamate base lens resin *consistaillay of a resin* obtained by reacting one or more NCO-containing compounds with one or more SH-containing aliphatic compounds, wherein the said SH-containing aliphatic compouns is a di(2-mercaptoalkyl)ether, 1,4-butanedithiol, di(2-mercaptoethyl) sulfide, 2-mercaptoethanol, ethylene glycol dithioglycolate, trimethylolpropane tris-(thioglycolate), or pentaerythritol tetrakis-(thioglycolate), wherein the said one or more NCO-containing compounds and the said one or more SH-containing aliphatic compounds are used in a ratio which provides a ratio of NCO groups to SH groups of from 0.5 to 3.0, *said S-alkyl thiocarbamate base lens resin being capable of forming a lens by casting polymerization in a lens mold.*

4. The S-alkyl thiocarbamate base lens resin of claim 1, wherein the said SH-containing aliphatic compound is a di(2-mercaptoalkyl)ether, pentaerythritol tetrakis-(thioglycolate), or [timethylolpropane] *trimethylolpropane* tris-(thioglycolate).

9. A *transparent optical* lens comprising a copolymer obtained by reacting one or more NCO-containing compounds with one or more SH-containing aliphatic compounds *by casting polymerization in a lens mold.*

*16. An S-alkyl thiocarbamate base lens resin obtained by reacting one or more NCO-containing compounds with one or more SH-containing aliphatic compounds, wherein the said SH-containing aliphatic compounds comprise a di(2-mercaptoalkyl)ether.*

*17. The S-alkyl thiocarbamate base lens resin of claim 16 wherein the said di(2-mercaptoalkyl)ether is di(2-mercaptoethyl)ether.*

*18. An S-alkyl thiocarbamate base lens resin obtained by reacting one or more NCO-containing compounds with one or more SH-containing aliphatic compounds, wherein the said SH-containing aliphatic compounds comprises a di(2-mercaptoalkyl)ether, and wherein the said one or more NCO-containing compounds and the said one or more SH-containing aliphatic compounds are used in a ratio which provides a ratio of NCO groups to SH groups of from 0.5 to 3.0.*

*19. The S-alkyl thiocarbamate base lens resin of claim 18 wherein the said di(2-mercaptoalkyl)ether is di(2-mercaptoethyl)ether.*

*20. A lens comprising a copolymer obtained by reacting one or more NCO-containing compounds with one or more SH-containing aliphatic compounds wherein the said SH-containing aliphatic compounds comprise a di(2-mercaptoalkyl)ether.*

*21. The lens of claim 20 wherein the said di(2-mercaptoalkyl)ether is di(2-mercaptoethyl)ether.*

*22. A lens comprising a copolymer obtained by reacting one or more NCO-containing compounds with one or more SH-containing aliphatic compounds wherein the said SH-containing aliphatic compounds comprise a di(2-mercaptoalkyl)ether, pentaerythritol tetrakis-(thioglycolate), or trimethylolpropane tris-(thioglycolate).*

*23. The lens of claim 22 wherein the said SH-containing aliphatic compounds comprise pentaerythritol tetrakis-(thioglycolate).*

* * * * *